United States Patent [19] [11] Patent Number: 4,904,550
Kano et al. [45] Date of Patent: Feb. 27, 1990

[54] SEALED LEAD-ACID BATTERY

[75] Inventors: Seizō Kanō; Naoki Fujimoto, both of Kyoto, Japan

[73] Assignee: Japan Storage Battery Company Limited, Kyoto, Japan

[21] Appl. No.: 210,484

[22] Filed: Jun. 23, 1988

[30] Foreign Application Priority Data

Jun. 25, 1987 [JP] Japan ............................ 62-158526

[51] Int. Cl.⁴ .......................................... H01M 2/04
[52] U.S. Cl. .................................. 429/163; 429/175; 429/185; 429/225
[58] Field of Search ............... 429/176, 175, 163, 225, 429/185, 4, 177; 206/333, 816; 220/66

[56] References Cited

U.S. PATENT DOCUMENTS

| 2,870,235 | 1/1959 | Soltis | 429/139 |
| 3,738,860 | 6/1973 | Von Roda et al. | 429/163 X |
| 3,791,874 | 2/1974 | Port | 429/163 X |
| 4,582,767 | 4/1986 | Morioka et al. | 429/163 X |
| 4,587,183 | 5/1986 | McCartney, Jr. | 429/176 |
| 4,664,994 | 5/1987 | Koike et al. | 429/163 |
| 4,758,482 | 7/1988 | Yamana et al. | 429/176 X |

Primary Examiner—Anthony Skapars
Attorney, Agent, or Firm—Sughrue, Mion, Zinn, Macpeak & Seas

[57] ABSTRACT

A sealed lead-acid battery is improved in manufacturability by providing a container with a major side left open, and being sealed by a laminated sheet heat-bonded to side edges of the opening after the battery components have been inserted. The laminated sheet may include a metal layer to improve rigidity.

7 Claims, 2 Drawing Sheets

SEALED LEAD-ACID BATTERY

BACKGROUND OF THE INVENTION

1. Field of the Invention

The present invention relates to an improvement in a sealed lead-acid battery suitable for use as a power supply for portable devices.

2. The Prior Art and Its Problems

Most sealed lead-acid batteries found on the market today as power supplies for portable devices are of two major types: in one type, the container is filled with the minimum required amount of electrolyte, which is retained between electrodes and absorbed by a highly retentive separator (retainer mat) so as to eliminate any flow of the electrolyte; in the second type, the electrolyte is immobilized by gelation with a silica powder. These sealed lead-acid batteries operate by utilizing a phenomenon generally referred to as the "oxygen cycle" in which oxygen gas evolving at the positive plates by electrolysis of water during charging reacts at the negative plates with the charged active material and electrolyte to be converted into water.

The container of such sealed lead-acid batteries has to satisfy the following performance requirements:

(1) It must retain in its interior the positive and negative plates, separator and dilute sulfuric acid electrolyte without letting the electrolyte leak out; the inner surface of the container must be resistant to sulfuric acid;

(2) The interior of the sealed lead-acid battery must be evacuated to a pressure of about one half an atmosphere during normal use, and when overcharged, the gases generated by hydrolysis of water produce a pressure equal to the working pressure of the safety valve; the battery container must have sufficient mechanical strength to withstand such pressure cycles, as well as the impact exerted by such external shocks as drops and collisions;

(3) When atmospheric oxygen enters the sealed lead-acid battery operating on the oxygen cycle principle, oxidation at the negative plates proceeds in preference to conversion to water, thereby upsetting the gas balance in the battery to cause a decrease in the water content of the electrolyte; in order to avoid this problem which will deteriorate the performance of the sealed lead-acid battery using an immobilized electrolyte, the container must have adequately low moisture and oxygen gas permeabilities.

(4) In the sealed lead-acid battery having the immobilized electrolyte, an assembled element must be kept under a highly pressed state and the electrolyte must be closely contacted to the positive and negative active materials in order to conduct the electrochemical reactions, such as charging and discharging, in a stable manner. Most of the prior art sealed lead-acid batteries employ containers of box shape molded from ABS and other resins and in order to satisfy the performance requirements described above, the container must have a wall thickness of about 2 mm.

A typical example of a sealed lead-acid battery fabricated according to the prior art is described hereinafter with reference to FIG. 4. An assembled element composed of a positive plate 8, a negative plate 9 and a separator 10 is accommodated in a container 11 in box form molded from ABS or other resins. The container 11 is sealed by bonding a cover 12 having a vent hole 16, terminal channels 15, etc. to the open end of the container. The battery shown in FIG. 4 is also furnished with a safety valve holder 14

In order to fabricate a sealed lead-acid battery having the construction described above, the assembled element has to be pressed into the opening in the container, but this causes great difficulty when the element is elongated or flat. Furthermore, the friction between each of the electrode plates and the inner surface of the container will cause shedding or cracking of the active materials (the powders of lead oxide and spongy lead) or other potential risks that lead to shorting or shorter life of the battery. The conventional practice of bonding the cover to the battery container with adhesives typically based on urethane or epoxy resins causes another problem in that batteries in process have to stay on the production line until the adhesive cures to a satisfactory degree.

There is a growing demand in the battery industry for smaller, thinner and higher-capacity sealed lead-acid batteries, but the need to employ containers having wall thicknesses of about 2 mm has been a great obstacle to the fabrication of batteries with higher performance.

With a view to solving the problems associated with the prior art sealed lead-acid batteries in such aspects as performance, ease of manufacture and consistency in product quality, various battery designs have been proposed, including a structure in which an assembled element is fitted in a thermoplastic synthetic resin container in frame form and both surfaces of the container are sealed with a synthetic resin film, and a structure in which the assembled element is enveloped with a container solely made of a film. While these designs have their own advantages, they are still unsatisfactory for large-scale production purposes in terms of such aspects as reliability and consistency in manufacture.

SUMMARY OF THE INVENTION

The above-described problems of the prior art can be solved by the present invention which provides a sealed lead-acid battery that is generally characterized in that an assembled element consisting of a positive plate, a negative plate and a separator is accommodated in a container molded from a thermoplastic synthetic resin that is open on one major side and which has a vent hole and terminal channels, said container being sealed by closing its open side with a heat-bondable sealing sheet.

In a preferred embodiment, the heat-bonded sheet applied to close the open side of the container is a laminated film of two or more synthetic resin layers.

In another preferred embodiment, the sealing sheet is a combination of a metal sheet bonded to a laminated film of two or more synthetic resin layers.

DETAILED DESCRIPTION OF THE PREFERRED EMBODIMENTS

Figure 1:
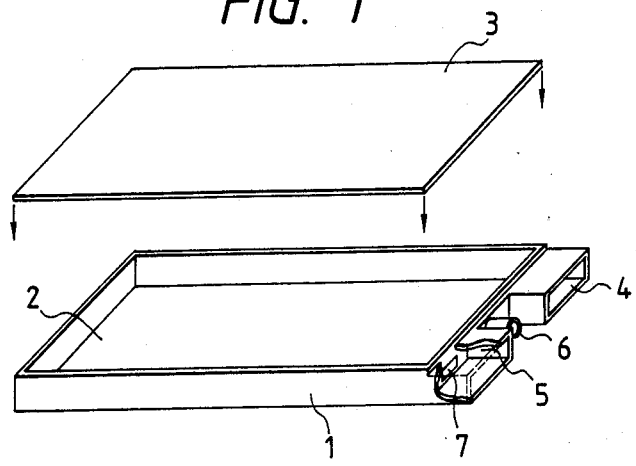
FIG. 1 is a perspective view of the container of a sealed lead-acid battery according to one embodiment of the present invention.

An embodiment of the present invention is described hereinafter with reference to FIGS. 1-3.

Shown by numeral 1 in these figures is a battery container molded from a thermoplastic synthetic resin such as polypropylene resin and which is open on one major side (usually a surface parallel to the electrode plates). This container is provided with terminal channels 4 and 5 and a vent hole 6 at one end. An assembled element consisting of a positive plate 8, a negative plate 9 and a separator 10 is accommodated in the recess 2 in the container 1. The positive and negative plate lugs are passed through a through hole 7 and soldered to current pickup terminals (not shown) in the form of a bar (or strip) or lead wire. Thereafter, the terminal channels 4 and 5 are filled with an epoxy resin or other suitable sealing resins so as to fix the electrode plates and prevent leakage of the electrolyte from the container. The vent hole 6 is furnished with a safety valve.

Figure 2:
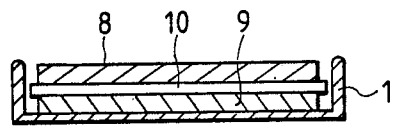
FIG. 2 is a cross section of the battery before the container is sealed.
Figure 3:
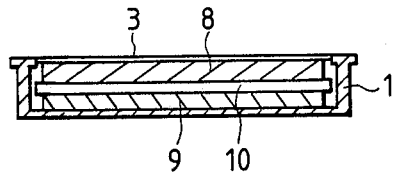
FIG. 3 is a cross section of the battery with its container sealed by fusing a sealing sheet.

FIG. 2 is a cross section of the container having the assembled element accommodated therein, and FIG. 3 is a cross section of the same container having its open side closed by heat bonding of a sealing sheet 3.

Figure 4:
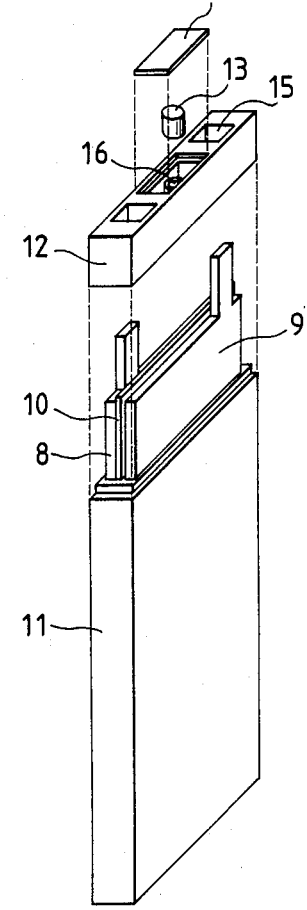
FIG. 4 is a perspective view showing the construction of a prior art sealed lead-acid battery; and FIG. is a graph comparing the performance of the prior art sealed lead-acid battery with that of two prototypes of the battery of the present invention.
Figure 5:
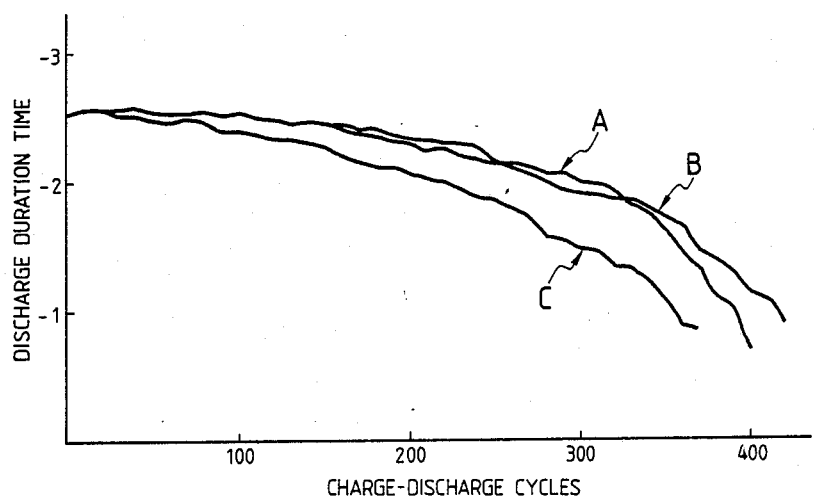

FIG. 5 shows the results of a performance test conducted on two prototypes of the sealed lead-acid battery of the present invention and a prior art battery having essentially the same dimensions and which has the geometry shown in FIG. 4.

In FIG. 5, curve A refers to the data for the prior art battery employing an ABS resin container having a wall thickness of 2.5 mm. Curves B and C refer to the two prototypes of the battery of the present invention, which employed a polypropylene resin molded container having a wall thickness of about 1 mm. The container of battery B was sealed with a laminated film consisting of polyethylene terephthalate (PET, 12 $\mu$m), polyvinylidene chloride (PVDC, 2 $\mu$m) and polypropylene (CPP, 40 $\mu$m). The container of battery C was sealed with a laminated film consisting of polyethylene terephthalate (PET, 12 $\mu$m) and polypropylene (CPP, 40 $\mu$m). The first laminated film had a water vapor permeability of 7 g/m$^2$ per day and an oxygen gas permeability of 10 cc/m$^2$ per day-atmosphere, whereas the second laminated film had a water vapor permeability of 20 g/m$^2$ per day and an oxygen gas permeability of 130 cc/m$^2$ per day atmosphere.

Judging from the data shown in FIG. 5, the prototype referred to by curve C was not capable of maintaining the intended performance until the end of its life. It was therefore concluded that the sealing sheet to be used in the present invention should desirably have a water vapor permeability of not more than 10 g/m$^2$ per day and an O$_2$ gas permeability of not more than 20 cc/m$^2$ per day atmosphere.

When curve A is compared with curve B, curve B, i.e., the battery of the present invention, exhibits a superior property than the conventional battery at the end of its life. This is because the first highly pressed state of the assembled element in the conventional ABS resin container is gradually lost due to degradation of the positive and negative plates and the separator as the battery becomes old. In the battery of the present invention, the pressing force applied to the assembled element is almost constant until the end of the life since the thin sheet is formed on a surface parallel to the assembled element. Thus, the constant pressure applied to the assembled element is maintained by using the pressure difference between the outside pressure and the inside pressure of the container, even if the positive and negative plates and the separator are degraded to reduce the thickness.

Such a sealing sheet is thin-walled and lacks rigidity and strength, and can be easily torn or damaged with a sharp-edged metal tool or the like. In addition, it is vulnerable to external shocks such as drops that will damage the assembled element in the container. Therefore, the sealed lead-acid batteries usually require outer protection such as metal cases when they are put to normal use. However, if the combination of a synthetic resin layer laminated to a metal sheet is used as a container sealing member, such outer protecting cases can be eliminated or simplified since such a laminated metal sheet exhibits both the sulfuric acid resistance and moisture and oxygen barrier properties of the synthetic resin layer and the strength and rigidity of the metal.

The synthetic resin layer in the laminated metal sheet is required to have heat bondability to the container. However, in the presence of a metal layer, it is difficult to control the state of fusion between the container and the synthetic resin layer, and sulfuric acid used as an electrolyte can penetrate through the resin layer to reach the metal sheet if it is insufficiently fused to the container. It is therefore necessary to provide between the fused layer and the metal layer an intermediate layer that is not only resistant to sulfuric acid, but also stable when subjected to heat applied during the fusion. To meet this requirement, the synthetic resin layer must consist of at least two layers. The metal sheet may be made of a material such as iron, stainless steel or aluminum. Even when such a laminated metal sheet is used, if the metal sheet is excessively thick, this causes not only the irregularity of the welding state and peeling between the metal sheet and the resin layer, but also the inability to press the assembled element by using the pressure difference between the atmospheric pressure and the pressure inside the container. Accordingly, it is necessary to make the thickness of the metal sheet thin so as to have flexibility. The sealing member may be fused to the container by a variety of methods including heat sealing using a heated plate, impulse sealing, and ultrasonic sealing.

The present invention offers the following advantages over the prior art in terms of battery performance and manufacturability.

(1) An assembled element can be readily accommodated in the container and this reduces not only the number of steps involved in assembly but also the chance of the active materials (the powders of lead oxide and spongy lead) shedding or cracking.

(2) The battery is sealed by fusing a sealing sheet to the container. In comparison with the prior art in which a cover is bonded to an ABS resin molded container with an adhesive, both the processing time and the residence time of product on the production line is shortened.

(3) Part of the container is replaced by a thin-walled member (i.e., sheet) and the area conventionally required for bonding the container and the cover with an adhesive is eliminated. As a result, the proportion of the battery's inner space occupied by the volume of the assembled element is increased, leading to higher performance of the battery.

(4) By laminating two or more layer selected from among films having low moisture and oxygen gas permeabilities, films having high mechanical strength and films having good heat bondability, a sheet having the advantages of each of the respective films can be obtained. Compared with the conventional container made of a single resin, this laminated sheet is thin, has higher performance and yet contributes to an improvement in the production rate of batteries.

(5) The sealing sheet is thin-walled and lacks rigidity but on the other hand, it has good sealing properties and ensures good protection against potential leakage of sulfuric acid electrolyte. Therefore, it can be used in combination with an outer reinforcing case made of steel or other metals that exhibit sufficient strength and rigidity even if they are not thick.

(6) Two or more layered synthetic resin films may be bonded to a sheet of a metal such as iron, stainless steel or aluminum so as to make a laminated metal sheet, one side of which has good bondability to the container. This laminated metal sheet exhibits not only the sulfuric acid resistance and moisture and oxygen permeabilities of the synthetic resin film but also the strength and rigidity of the metal sheet. Therefore, by using such a laminated metal sheet as a container sealing member, the conventionally required outer reinforcing case can be eliminated or simplified.

(7) By using the container in which a surface parallel to the assembled element is a thin sealing sheet, the assembled element is kept under a constant pressed state due to the pressure difference between the atmospheric pressure and the pressure inside the container from the beginning to the end of the life of the battery, and the stability of the battery, especially the life of the battery, can be improved.

We claim:

1. A sealed lead-acid battery, comprising: an assembled battery element comprised of a positive plate, a negative plate and a separator; a container molded from a thermoplastic synthetic resin and open on one major side, for accommodating said assembled element; and means for sealing said container by closing its open side comprising a heat-bondable sealing sheet, wherein said sealing sheet is a laminated metal sheet having at least two synthetic resin films being bonded to an inner surface of a sheet of metal, with the innermost film of said laminated sheet being heat bondable to the container.

2. A sealed lead-acid battery comprising: an assembled battery element comprised of a positive plate, a negative plate and a separator; a container molded from a thermoplastic synthetic resin and open on one major side, for accommodating said assembled element; and means for sealing said container by closing its open side comprising a heat-bondable sealing sheet, wherein said sealing sheet is a laminated film of at least two synthetic resin layers which exhibits a moisture permeability of no more than 10 $g/m^2 \cdot day$ and an oxygen gas permeability of no more than 20 $cc/m^2 \cdot day\text{-}atm$, with one one side of said film being heat-bondable to the container.

3. A sealed lead-acid battery according to claim 2, wherein said laminated film is comprised of layers of polyethylene terphthalate, polyvinylidene chloride and polypropylene.

4. A sealed lead-acid battery according to claim 1, wherein said metal sheet is comprised of one of aluminum, iron and stainless steel.

5. A sealed lead-acid battery according to claim 1, wherein said laminated metal sheet comprises at least a first synthetic resin film which is heat-bondable to the container, and a second synthetic resin film which is resistant to sulfuric acid and stable when subjected to the heat of heat bonding and is disposed intermediate said first synthetic resin film and said sheet of metal.

6. A sealed lead-acid battery according to claim 1, wherein said container includes a vent and terminal channels located at an end thereof.

7. A sealed lead-acid battery according to claim 6, wherein said one major side of said container is a surface parallel to said assembled element, and further wherein said sealing sheet extends over the assembled element accommodated in said container, but not over said terminal channels located at said end.

* * * * *